United States Patent [19]

Ueda

[11] Patent Number: 5,247,432
[45] Date of Patent: Sep. 21, 1993

[54] FEEDBACK CONTROL APPARATUS AND METHOD

[75] Inventor: Tamio Ueda, Takatsuki, Japan

[73] Assignee: Omron Corporation, Kyoto, Japan

[21] Appl. No.: 775,082

[22] Filed: Oct. 11, 1991

[30] Foreign Application Priority Data

Oct. 17, 1990 [JP] Japan .................................. 2-279940

[51] Int. Cl.$^5$ ............................................ G05B 13/02
[52] U.S. Cl. .................... 364/162; 364/148; 364/160; 395/900
[58] Field of Search ................ 364/141, 148, 153, 176, 364/160-163; 395/3, 900

[56] References Cited

U.S. PATENT DOCUMENTS 5,129,475 7/1992 Kawano et al. ..................... 395/900

FOREIGN PATENT DOCUMENTS 2-8903 1/1990 Japan ................................... 364/192

OTHER PUBLICATIONS

Patent Abstracts of Japan, vol. 14, No. 148 (P-1024) Mar. 20, 1990 & JP-A-20 08 903.
Patent Abstracts of Japan, vol. 14, No. 1148 (CP-697) Mar. 6, 1990 & JP-A-13 1 619.
Patent Abstracts of Japan, vol. 13, No. 586 (P-982) Dec. 25, 1989 & JP-A-12 50 103.
Patent Abstracts of Japan, vol. 13, No. 57 (P-825) Feb. 9, 1989 & JP-A-63 247 801.
Proceedings of the IEE Internat'l Conf. on Control and Appln., Apr. 1989, Jerusalem, Ill., pp. 1-5 G. W. Neat, et al.

Primary Examiner—Jerry Smith
Assistant Examiner—Steven R. Garland
Attorney, Agent, or Firm—Dickstein, Shapiro & Morin

[57] ABSTRACT

In a control method for use in a feedback control apparatus having at least one of a proportional component, an integral component, a differential component and a combination thereof for outputting, in response to a deviation between a given target value and a controlled variable detected in a control object, a first manipulated variable to be supplied to the control object. A check is made to decide whether or not the controlled variable attained from the control object is within a settling range established with the target value set as a center thereof. When the controlled variable is judged to be beyond the settling range, a fuzzy reasoning is achieved in response to the given deviation according to predetermined reasoning rules to produce a second manipulated variable. The second manipulated variable is added to the first manipulated variable to obtain a third manipulated variable, which is then supplied to the control object. When the controlled variable is judged to be within the settling range, the first manipulated variable is supplied to the control object.

6 Claims, 6 Drawing Sheets

Fig.4

| d / dd | NB | NS | ZR | PS | PB |
|---|---|---|---|---|---|
| PB | ZR | PS | PM | PB | PB |
| PS | NS | ZR | PS | PM | PB |
| ZR | NM | NS | ZR | PS | PM |
| NS | NB | NM | NS | ZR | PS |
| NB | NB | NB | NM | NS | ZR |

FEEDBACK CONTROL APPARATUS AND METHOD

BACKGROUND OF THE INVENTION

1. Field of the Invention

The present invention relates to a feedback control apparatus achieving any one of a proportional control, an integral control, a differential control, and a control based on a combination thereof.

2. Description of Related Art

Recently, the usefulness of the fuzzy control has been broadly recognized and hence various applications of the fuzzy control have been developed in man fields.

In a feedback automatic control of the prior art, in response to a deviation between a target value and a control variable detected on a control object, there is conducted a proportional control, an integral control, a differential control, or a control based on a combination thereof (e.g. a proportional integral control). Although it is also possible to combine the fuzzy control with the conventional feedback control of this type, how to combine these control methods with each other for a desired result has not been satisfactorily clarified yet. The results may possibly be deteriorated depending on the combinations in some cases.

SUMMARY OF THE INVENTION

It is therefore an object of the present invention to provide an efficient combination of the conventional automatic control and the latest fuzzy control.

In accordance with the present invention, there is provided a feedback control apparatus having at least one of a proportional component, an integral component, a differential component and the combinations thereof for outputting, in response to a deviation between a given target value and a controlled variable detected in a control object, a first manipulated variable to be supplied to the control object comprising fuzzy reasoning means for receiving the deviation, conducting a fuzzy reasoning based on predetermined reasoning rules and producing a second manipulated variable to be fed to the control object, switching control means for judging whether or not the controlled variable attained from the control object is within a settling range established with the target value set as a center thereof, and output means for adding the first and second manipulated variables to each other to obtain a third manipulated variable which is delivered to the control object when the controlled variable is judged to be beyond the settling range by the switching control means and outputting the first manipulated variable to the control object when the controlled variable is judged to be within the settling range by the switching control means.

Moreover, there is provided, in accordance with the present invention, a control method for use in a feedback control apparatus having at least one of a proportional component, an integral component, a differential component and the combinations thereof for outputting, in response to a deviation between a given target value and a controlled variable detected in a control object, a first manipulated variable to be supplied to the control object comprising the steps of judging whether or not the controlled variable attained from the control object is within a settling range established with the target value set as a center thereof, conducting, when the controlled variable is judged to be beyond the settling range, a fuzzy reasoning in response to the deviation according to predetermined reasoning rules to produce a second manipulated variable, adding the second manipulated variable to the first manipulated variable to obtain a third manipulated variable and supplying the third manipulated variable to the control object, and delivering the first manipulated variable to the control object when the controlled variable is judged to be within the settling range.

In the fuzzy control, the control characteristic can be determined depending on the specified rules. In particular, when an external disturbance appears, the fuzzy control develops a remarkable response characteristic. Namely, the fuzzy control rapidly responses to the external disturbance to restore the controlled variable to the target value. As contrast thereto the conventional automatic control such as a proportional control, a proportional integral control, or a proportional integral differential control is efficient in the settling characteristic when the controlled variable is in a settling range or zone established with the target value set as a center thereof Assuming that the fuzzy control is kept combined with the automatic control of the prior art, namely, that the manipulated variable produced from the fuzzy control is always added t that generated from the conventional automatic control so as to supply a result of the addition to the control object, the response characteristic with respect to the external disturbance is improved. However, there arises a problem that the settling characteristic is deteriorated due to an increase in the gain.

In accordance with the present invention, when the controlled variable attained from the control object is within the settling range, there is effected the conventional automatic control developing the satisfactory settling characteristic. On the other hand, in a case where the controlled variable is beyond the settling range because of an external disturbance, the system initiates the fuzzy reasoning which has a superior response characteristic. The manipulated variable attained from the fuzzy control is added to that created from the conventional automatic control so as to supply a result of the addition to the control object. Consequently, according to the present invention, favorable settling and response characteristics are attained at the same time.

BRIEF DESCRIPTION OF THE DRAWINGS

These and other objects and advantages of the present invention will become apparent by reference to the following description and accompanying drawings wherein:

FIG. 4 is a table showing examples of inference or reasoning rules for the fuzzy control;

DESCRIPTION OF THE PREFERRED EMBODIMENTS

Figure 1:
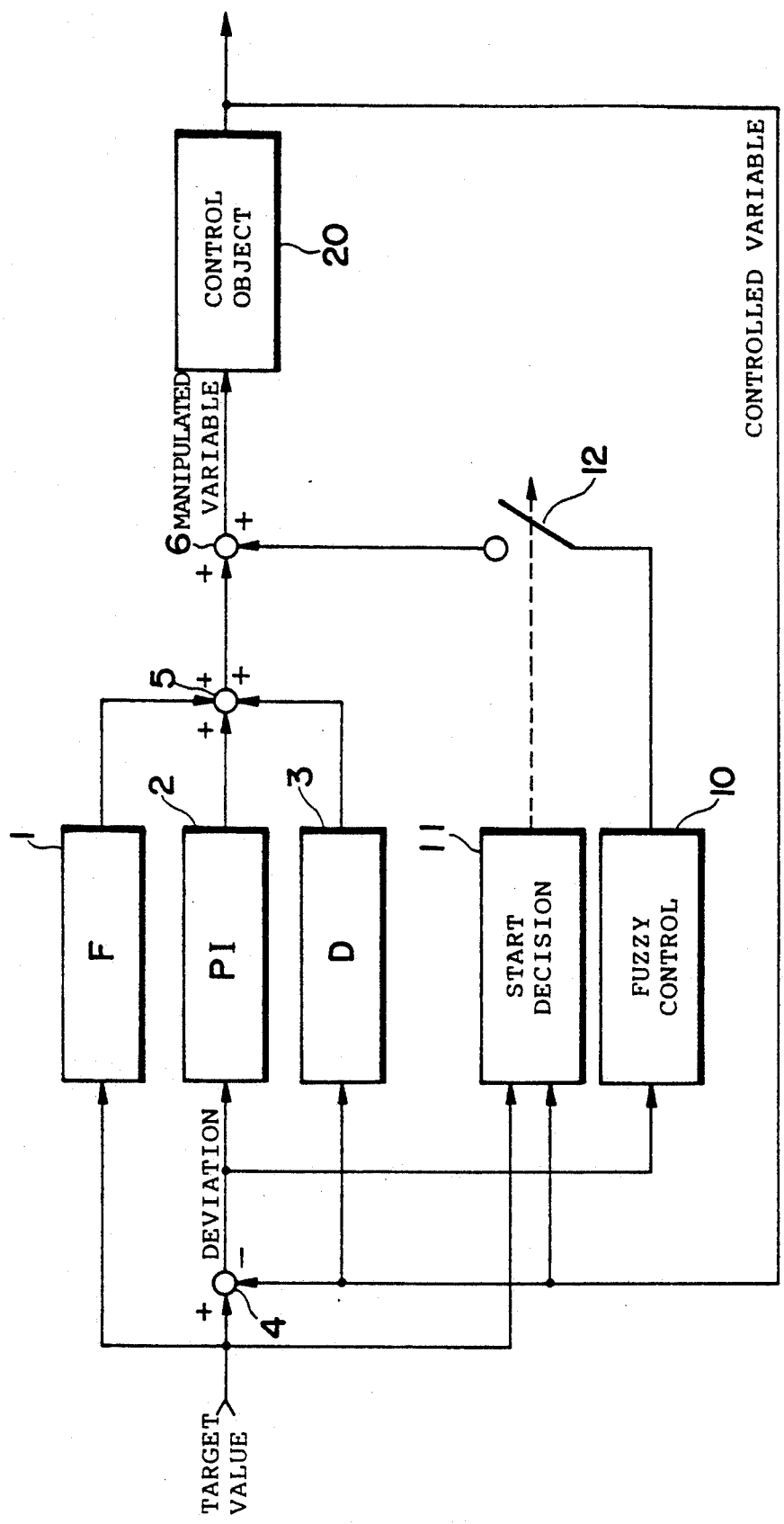
FIG. 1 is a schematic diagram showing the constitution of a control system in an embodiment associated with the feedback control apparatus and method in accordance with the present invention.

FIG. 1 shows a control system employed to implement the feedback control apparatus and method in accordance with the present invention.

A conventional feedback control apparatus or controller to be constituted with a proportional component or element, an integral component, a differential component, and combinations thereof includes in this embodiment a forward (F) component or element 1, a proportional integral (PI) component 2, and a differential (D) component 3. The F component is supplied with a target value. A subtracter component or element 4 calculates a difference between the target value and a controlled variable attained from a control object 20. The subtracter component 4 produces an output representing a deviation of the controlled variable with respect to the target value. The deviation is delivered to the PI component 2, whereas the controlled variable is fed to the D component 3. The system may be structured to supply the deviation to the D component.

Responsive outputs respectively obtained from the F, PI, and D components 1 to 3 are fed to an adder component 5 to be added therein to each other. The adder component 5 generates an output called a first manipulated variable.

The configuration includes a fuzzy controller section 10. This controller 10 receives the deviation created from the subtracter component 4. Based on the deviation as an input thereto, the fuzzy controller 10 accomplishes a fuzzy reasoning operation in conformity to reasoning rules and membership functions, which will be described later, to produce a second manipulated variable expressed by a result of the reasoning.

A start decision section 11 is disposed to decide whether or not the fuzzy controller 10 is initiated or whether or not the second manipulated variable generated from the fuzzy control section 10 is used to control the control object 20. The start decision section 11 is supplied with the target value and the controlled variable. This configuration may be structured to supply the deviation to the start decision section 11.

The start decision section 11 supervises the switch component 12. When the switch component 12 is on, the first manipulated variable attained from the adder component 5 and the second manipulated variable obtained from the fuzzy reasoning section 10 are added to each other by the adder component 6. A result of the addition is sent as a (third) manipulated variable to the control object 20. When the switch component 12 is off, the addition is not accomplished, namely, the first manipulated variable is directly fed to the control object 20.

Specifically, in a case where the controlled variable received from the control object 20 is within a settling range or zone, the switch component 12 is off in principle; whereas, in other cases, the switch component 12 is on in principle, which will be described in detail later.

The constituent components 1-6 and 12, the fuzzy controller 10, and the start decision section 11 are realized by use of a computer (CPU) and a program prepared to be integral therewith. Naturally, these components and sections may also be implemented by hardware circuits.

In the fuzzy controller 10, a fuzzy reasoning is conducted in conformity with rules most generally employed, namely, so-called "If, then rules". Let us assume here that the deviation between the target value and the controlled variable supplied to the fuzzy reasoning section 10 is expressed as d and the differential value thereof is represented as dd. When the deviation is sampled at a fixed cycle or period, the differential value sd is attained as a discrepancy between the deviation previously sampled and that obtained in the current sampling operation.

In the fuzzy reasoning rules, each antecedent includes the deviation d and the differential value dd, whereas each consequent contains the second manipulated variable U.

Figure 5A:
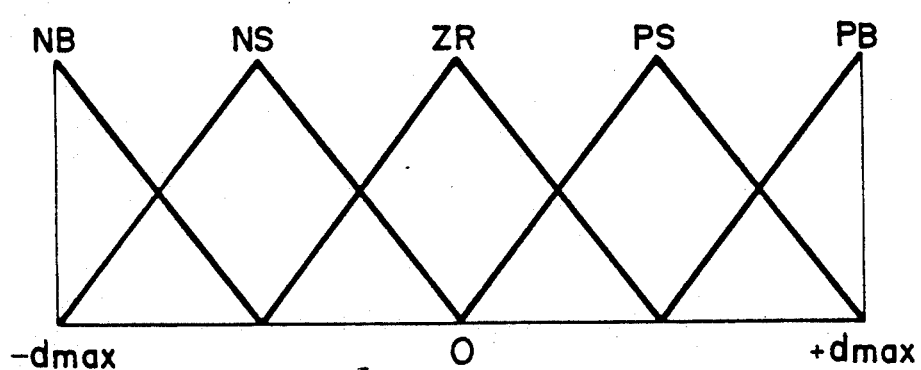
FIGS. 5a and 5b are graphs each showing examples of antecedent membership functions of the reasoning rules.
Figure 5B:
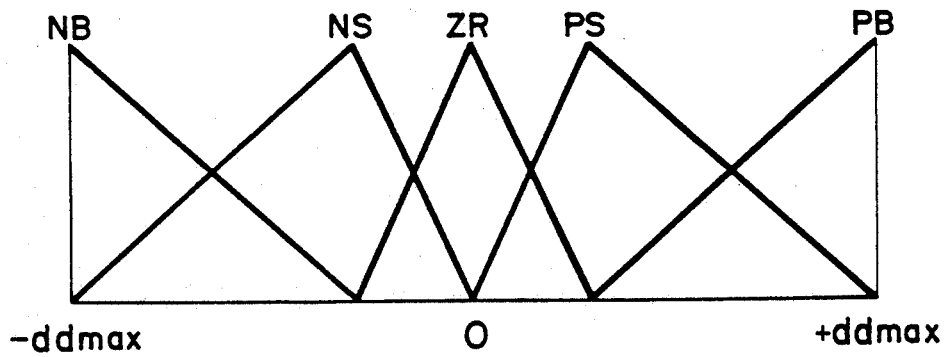
Figure 6:
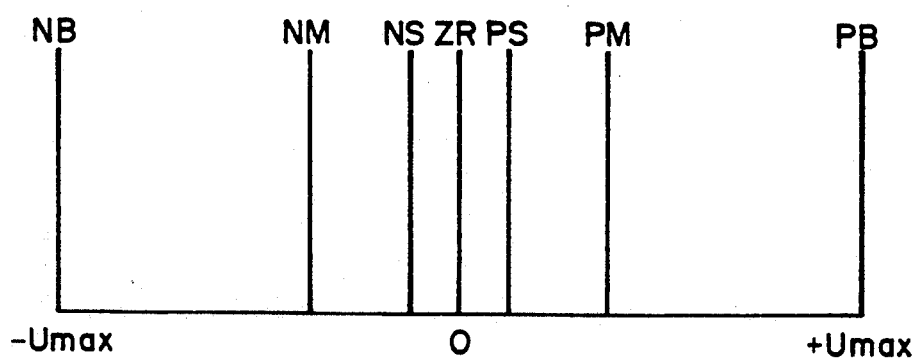
FIG. 6 is a graph showing examples of consequent membership functions of the reasoning rules.

FIGS. 5a and 5b show examples of membership functions of deviation d and the differential value dd, respectively. Moreover, FIG. 6 shows examples of membership functions including consequents associated with the second manipulated variable U. Each membership function of the second manipulated variable U is represented with a singleton.

In these graphs, capital letters NB, NM, NS, ZR, PS, PM, and PB stand for negative big, negative medium, negative small, almost zero, positive small, positive medium, and positive big, respectively.

FIG. 4 shows in a table form examples of reasoning rules established in the fuzzy control section 10. For example, the content of the left-most cell in the upper-most row represents the following rule.

If $d = NB$ and $sd = PB$, then $U = ZR$

A result of an execution of the fuzzy reasoning is defuzzified in a method e.g. a method of center of gravity, thereby finally producing the second manipulated variable.

The fuzzy reasoning rules need only be established to develop a desired characteristic; however, in general, there are employed fuzzy reasoning rules which cause the deviation between the target value and the controlled variable to be rapidly decreased i.e. which enable the controlled variable to approach the target value at a high speed.

The antecedent of the fuzzy reasoning membership function may include a first-order differential value dd and a second order differential value ddd of the deviation d.

Figure 2:
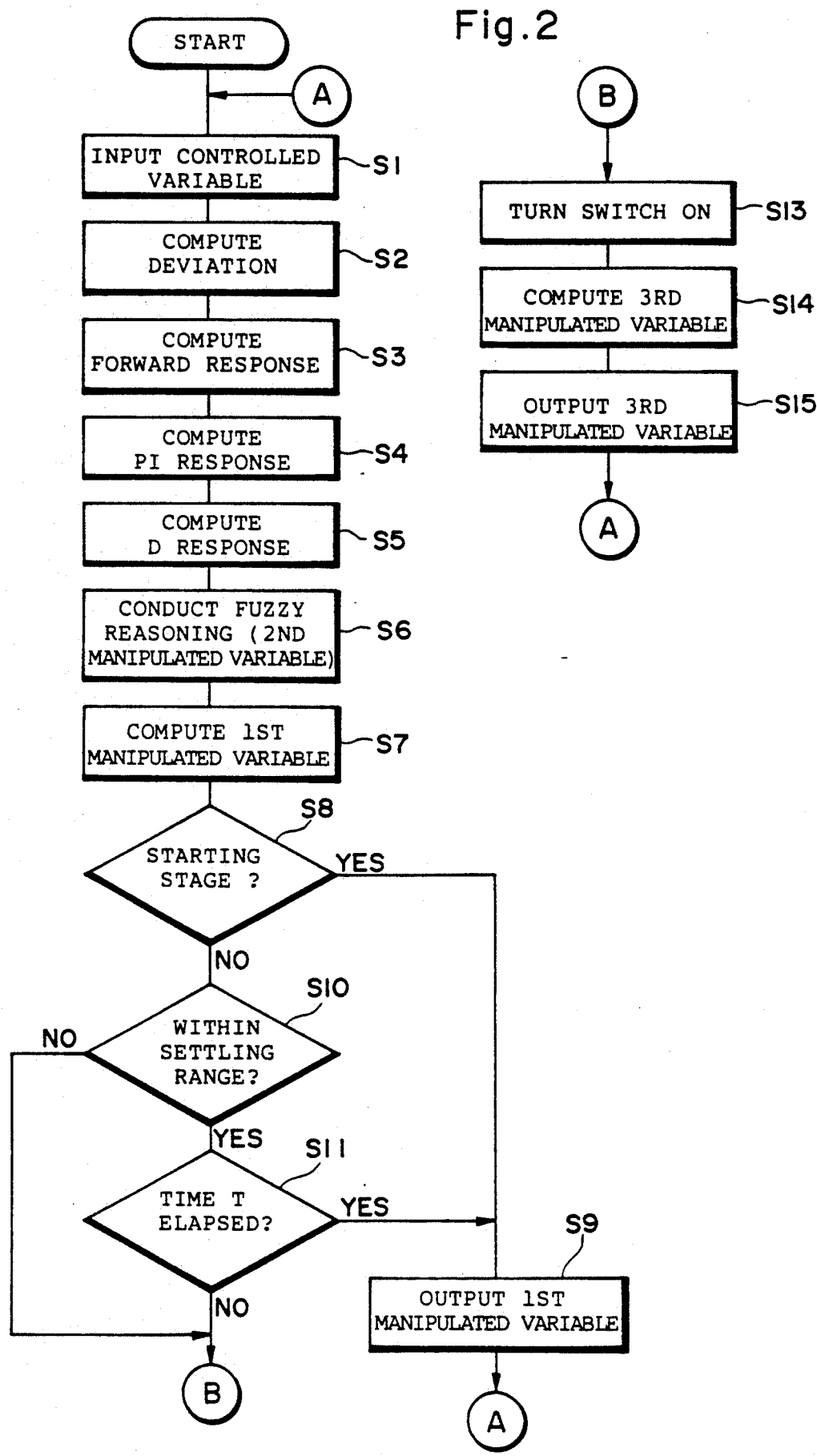
FIG. 2 is a flowchart showing the operation procedure of a feedback control achieved in the embodiment of FIG. 1.
Figure 3:
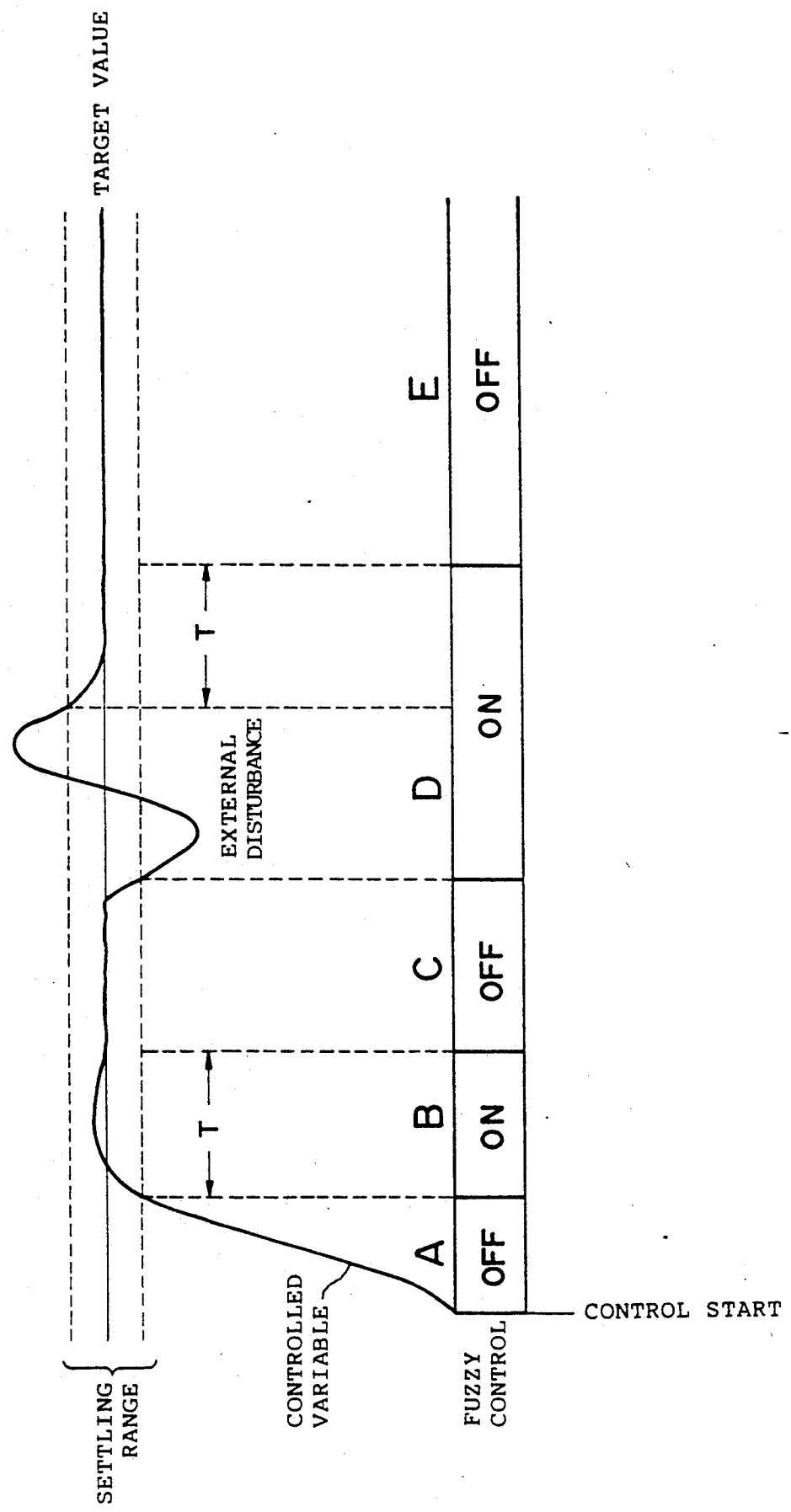
FIG. 3 is a diagram illustratively showing a change of controlled variable with respect to time in association with the ON and OFF states of fuzzy control.

FIG. 2 shows the processing procedure of the feedback control executed by the central processing unit (CPU) achieving the function of FIG. 1; whereas, FIG. 3 shows a state in which the control object 20 is controlled through the feedback control processing in association with a change in the controlled variable obtained from the control object.

As shown in FIG. 3, a settling range or zone is established with the target value set as substantially the center thereof, namely, the upper-limit and lower-limit lines are drawn with appropriate distances from the center line related to the target value. As described above, in principle, when the controlled variable is within the settling range, the first manipulated variable is directly delivered to the control object 20. When the controlled variable is beyond the settling range, the second manipulated variable produced from the fuzzy controller 10 is added to the first manipulated variable to obtain a third manipulated variable, which is then fed to the control object 20. However, in the starting stage after the control object 20 is initiated, the second manipulated variable is not added to the first manipulated variable before the controlled variable changed from its initial value enters the settling range. Namely, in this period, the first manipulated variable is directly supplied to the control object 20. Moreover, even when the control variable enters the settling range, before a predetermined period of time T is elapsed with the controlled variable remaining in the settling range, the second manipulated variable is added to the first manipulated variable to generate the third manipulated variable, thereby delivering the third manipulated variable to the control object 20.

Referring now to FIG. 2, when a controlled variable attained from the control object 20 is received (step S1), a discrepancy between the target value and the controlled variable, namely, a deviation is computed (step S2). Based on the target value, the controlled variable, or the deviation; the F component 1, the PI component 2 and the D component 3 produce respective responses or responsive outputs (steps S3 to S5); moreover, a fuzzy reasoning is executed by the fuzzy controller 10 to obtain a second manipulated variable (step 6). The second manipulated variable may be computed only when necessary, namely, only before or after a step S13, which will be described later. Thereafter, the F response, the PI response and the D response are added to each other to attain a first manipulated variable (step S7).

Subsequently, a check is made to determine whether or not the present state is a starting stage (between when the control object 20 is initiated and when the controlled variable enters the settling range; step S8). If this is the case, the first manipulated variable thus computed is fed to the control object 20.

In other than the starting stage, whether or not the controlled variable is within the settling range is judged (step S10). If this is the case, whether or not a period of time T has already elapsed from when the controlled variable entered the settling range is determined (S11). The period of time T is measured by a timer which is cleared to zero to start measuring the time when the control variable enters the settling range and which is reset when the period of time T is elapsed therefrom or when the controlled variable moves to outside of the settling range. If the timer indicates that the period of time T has already elapsed, the first manipulated variable thus computed is delivered to the control object 20 (step S9).

When the controlled variable is beyond the settling range or when the timer indicates that the period of time T has not elapsed, the switch component 12 is set to the on state (or the fuzzy reasoning operation is started by the fuzzy controller 10; step S13), the second manipulated variable is added to the first manipulated variable to attain a third manipulated variable (step S14). The third manipulated variable is then supplied to the control object 20 (step S15).

In the step S9 or S15, after the manipulated variable is fed to the control object, control is again passed to the step S1. The processing above is repeatedly executed at a fixed interval of time.

Referring now to FIG. 3, the operations of the fuzzy controller 10 (or the switch component 12) in the on and off states will be described. When the controller 10 is on, the first and second manipulated variables are added to each other.

In the starting stage (time zone A) immediately after the start of the control operation, the fuzzy controller 10 (switch component 12) is off and hence the first manipulated variable is delivered to the control object 20.

In a time zone B (from when the controlled variable enters the settling range to when the period of time T has elapsed therefrom), the fuzzy controller 10 is on and consequently the first and second manipulated variables are added to each other so as to supply a result of the addition (third manipulated variable) to the control object 20.

When the period of time T has elapsed, the fuzzy controller 10 is again set to the off state (time zone C).

When the controlled variable is moved to the outside of the settling range due to an external disturbance, the fuzzy controller 10 is again set to the on state and resultantly the first and second manipulated variables are added to each other (time zone D). Thereafter, even when the controlled variable enters the settling range, the fuzzy controller 10 is kept retained in the on state until the period of time T is elapsed. When the period of time T is elapsed, the fuzzy controller 10 is set to the off state (time zone E).

As described above, in a period of time from when the controlled variable enters the settling range to when the period of time T is elapsed, the second manipulated variable produced from the fuzzy controller 10 is used for the operation for the following reason: namely, even when the controlled variable enters the settling rage, the controlled variable may be moved to the outside therefrom due to an occurrence of an overshoot. Since the fuzzy controller 10 has a high response characteristic, when the second manipulated variable generated from the fuzzy controller 10 is added to the first manipulated variable, the occurrence of the overshoot or the like can be prevented and hence the controlled variable can be stabilized in a short period of time.

As described above, when the controlled variable is within the settling range, the conventional feedback control superior in the settling characteristic is utilized without employing the addition of the fuzzy control output above. Only when the controlled variable is beyond the settling range, is the fuzzy control output having a high response characteristic adopted for the operation, thereby improving the settling and response characteristics at the same time.

As many apparently widely different embodiments of the present invention can be made without departing from the spirit and scope thereof, it is to be understood that the invention is not limited to the specific embodiments thereof except as defined in the appended claims.

What is claimed is:

1. A feedback control apparatus having at least one of a proportional component, an integral component, a differential component and a combination thereof for outputting, in response to a deviation between a given target value and a controlled variable detected in a control object, a first manipulated variable to be supplied to the control object, said apparatus comprising:

fuzzy reasoning means for receiving the deviation, conducting a fuzzy reasoning based on predetermined reasoning rules, and producing a second manipulated variable to be fed to the control object.

switching control means for judging whether or not the controlled variable attained from the control object is within a settling range established with the target value set as substantially a center thereof; and output means for adding the first and second manipulated variables to each other to obtain a third manipulated variable and outputting the third manipulated variable to the control object when the controlled variable is judged to be beyond the settling range by said switching control means and for outputting the first manipulated variable to the control object when the controlled variable is judged to be within the settling range by said switching control means.

2. A feedback control apparatus in accordance with claim 1, wherein said switching control means decides that the controlled variable is within the settling range when a present constant period of time has elapsed after the controlled variable enters and is retained in said settling range.

3. A feedback control apparatus in accordance with claim 1, wherein said output means outputs the first manipulated variable to the control object without achieving the addition of the second manipulated variable before the controlled variable enters the settling range in a starting stage of the control object.

4. A control method for use in a feedback control apparatus having at least one of a proportional component, an integral component, a differential component and a combination thereof for outputting, in response to a deviation between a given target value and a controlled variable detected in a control subject, a first manipulated variable to be supplied to the control object, said method comprising the steps of:

judging whether or not the controlled variable attained from the control object is within a settling range established with the target value set as substantially a center thereof;

conducting, when the controlled variable is judged to be beyond the settling range, a fuzzy reasoning in response to the deviation according to predetermined reasoning rules to produce a second manipulated variable, adding the second manipulated variable to the first manipulated variable to obtain a third manipulated variable, and supplying the third manipulated variable to the control object; and delivering the first manipulated variable to the control object when the controlled variable is judged to be within the settling range.

5. A control method in accordance with claim 4, wherein the controlled variable is judged to be within the settling range when a preset constant period of time has elapsed after the controlled variable enters and is retained within the settling range.

6. A control method in accordance with claim 4, wherein the first manipulated variable is outputted to the control object without being added to the second manipulated variable before the controlled variable enters the settling range in a starting stage of the control object.

* * * * *